United States Patent [19]

Capron

[11] Patent Number: 4,606,674

[45] Date of Patent: Aug. 19, 1986

[54] STRUCTURAL WHEEL ELEMENT

[76] Inventor: Mark E. Capron, 1771 Via Escondido, San Lorenzo, Calif. 94580

[21] Appl. No.: 602,795

[22] Filed: Apr. 23, 1984

[51] Int. Cl.$^4$ .............................................. E02D 5/54
[52] U.S. Cl. .................................. 405/224; 405/195; 405/207; 52/224; 52/245
[58] Field of Search .............. 52/108, 80, 223 R, 224, 52/245; 150/50; 261/DIG. 11; 405/246, 224, 248, 192, 195, 207

[56] References Cited

U.S. PATENT DOCUMENTS

| 294,078 | 2/1884 | Robinson | 405/11 |
|---|---|---|---|
| 2,557,878 | 6/1951 | Lankenau | 52/192 |
| 3,564,789 | 2/1971 | Vyvyan | 52/108 |
| 3,648,990 | 3/1972 | Stoker | 261/DIG. 11 |
| 3,668,876 | 6/1972 | Koehler | 52/80 |
| 3,698,198 | 10/1972 | Phelps | 405/204 |
| 3,812,771 | 5/1974 | Yokoyama | 52/648 |
| 3,879,951 | 4/1975 | Mason | 405/60 |
| 3,889,433 | 6/1975 | Eubank | 52/648 |
| 3,918,518 | 11/1975 | James | 261/DIG. 11 |
| 3,922,827 | 12/1975 | Rosenblatt | 52/80 |
| 4,009,580 | 3/1977 | Dowse | 405/204 |
| 4,334,391 | 1/1982 | Hedgepeth | 52/108 |
| 4,373,834 | 2/1983 | Grace | 405/60 |
| 4,449,850 | 5/1984 | Cessoa | 405/60 |

FOREIGN PATENT DOCUMENTS

| 70388 | 12/1949 | Denmark | 150/55 |
|---|---|---|---|
| 586020 | 10/1933 | Fed. Rep. of Germany | 52/80 |
| 2947281 | 5/1981 | Fed. Rep. of Germany | 405/60 |
| 561819 | 6/1944 | United Kingdom | 150/55 |
| 678174 | 12/1977 | U.S.S.R. | 52/192 |

OTHER PUBLICATIONS

Geodesics by Edward Popko, fig. No. 62.
Geodesics by Edward Popko, ©1968 by University of Detroit Press, figures 67–76.

Primary Examiner—Henry E. Raduazo
Attorney, Agent, or Firm—Robert F. Beers; Arthur A. McGill; Michael J. McGowan

[57] ABSTRACT

At least two generally parallel compression rims are joined by tension element spokes, such as cables. A rim separating means, such as columns, holds the rims apart thus maintaining spoke tension. The resulting structural element, comprising rims, tension elements and separating means, becomes an efficient means of transferring external forces from one rim to the other.

9 Claims, 21 Drawing Figures

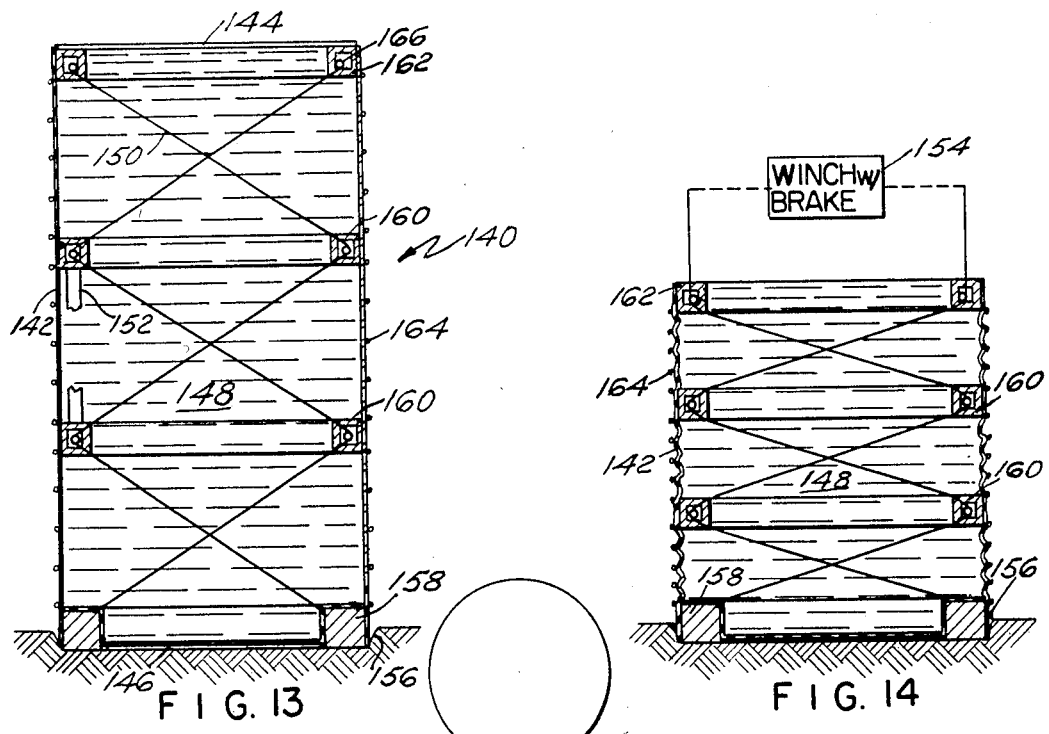
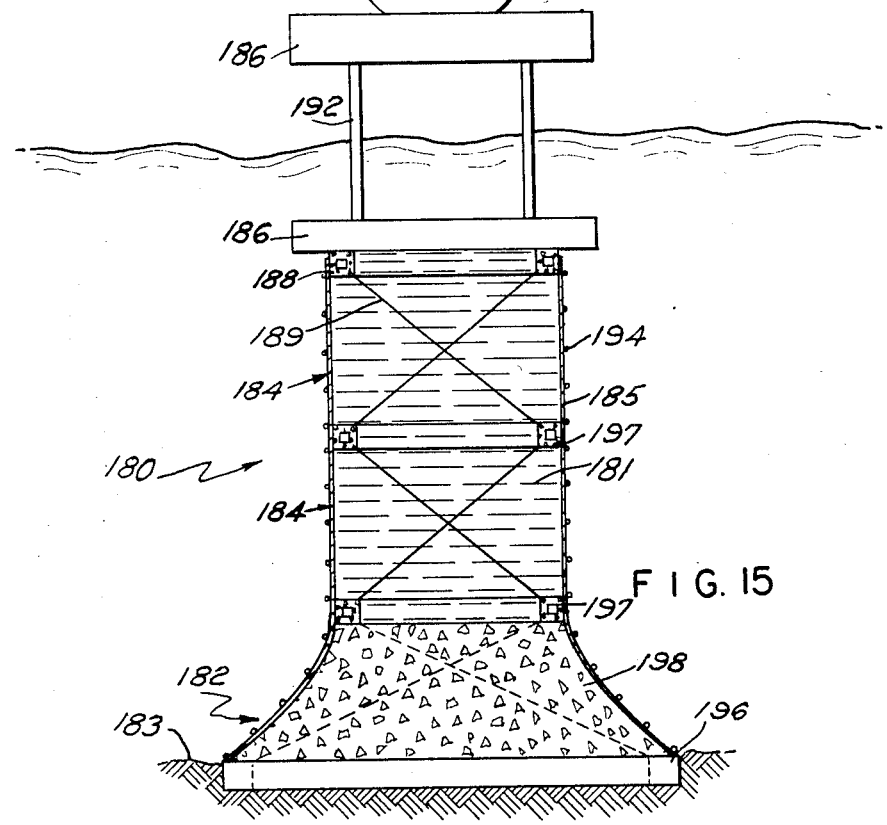

STRUCTURAL WHEEL ELEMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a novel structural element and more particularly to a structural component comprising a pair of rim members connected to each other by means of a plurality of spokes arranged such that upon application of a force acting to separate the rims, tension loads are produced in the spokes and compression loading is produced in the rim members thereby providing a balanced structure having substantial strength for its weight.

(2) Description of the Prior Art

One of the primary goals of structural engineering is to produce an "efficient" structure, i.e., a structure which uses the least possible amount of material commensurate with meeting preselected design parameters. Normally this is accomplished by refining the individual structural elements such that they carry only simple tension or compression loads, e.g., replacing a rectangular beam with a truss or replacing a beam with an arch. More recent examples of developments in the structural element area are geodesic domes and large fabric structures. The present invention represents a new type of structural element having many possible applications for resolving a broad range of existing structural problems of which the following are merely exemplary.

Heretofore, wheels have been made using either a heavy single piece dish attached to a rim, as seen in a typical automobile wheel, or using a hub, spokes and a relatively narrow rim such as in a bicycle wheel. Wide wheels had to be of relatively solid, heavy construction. Such a heavy, one-piece rim leaves the resulting wheel with high mass and rotational moment of inertia which decreases acceleration and fuel efficiency. Large aircraft, in particular, would benefit from large, low mass wheels.

Artificial ocean islands, such as those used as oil production platforms in the Arctic Ocean, in order to be built without a caisson-type structure to reinforce and contain the fill, must have gentle side slopes on the order of 15 to 1. The amount of fill material required to construct such an island however increases exponentially as a function of water depth. For water over 30 meters deep, such uncontained islands require so much fill that they are no longer considered economical. Previously, caisson contained and reinforced islands have been built, each requiring relatively massive steel or concrete structures for containing the fill and helping to distribute loads from ocean wave, ice and ship impacts against the island's foundation. The primary disadvantages of such rigid caisson-type structures are; a large quantity of steel and concrete is required to form the structure, the large noncollapsible shape is difficult to construct and to transport to the site, and the structure is less efficient in that it requires additional material to provide the required strength. To reduce the amount of material required, such caissons are normally placed on top of an artificial sea mount. This however, exposes the island to a failure mode wherein the caisson may be shoved off the mount. In some cases, a sheet pile wall or group of sheet pile cells is used to contain the fill. Sheet pile caissons, however, require a long period of good weather on site to permit driving of the piles.

Bucket or basket-type containers use tubular or tension fabric construction to contain the fill material and to distribute the lift forces. For extremely large containers, such as a dead weight anchor, tubes with their solid side walls and flat bottoms are not structurally efficient. Significant amounts of material are required to resist bending stress in both the flat bottom disc, and the connection between the bottom and the side walls. Tension fabric containers are more structurally efficient. However, their smooth rounded shape offers little resistance to dragging across the ocean bottom when a large lateral force is applied to the anchored structure.

Present above ground fluid tanks are essentially tubes. For oil storage such tanks are generally short fat tubes. One factor which limits their economical size is the wall thickness that is required to prevent buckling failure when large lateral forces, such as those generated by an earthquake, are applied. The traditional all-welded, steel oil tank must be built on site. This obviates the savings and faster deployment possible with a prefabricated collapsible structure.

Towers and tall buildings transfer lateral forces, e.g., from wind and earthquake, to their foundations by guy wires, diagonal truss bracing, shear walls, or moment resisting frames. The primary disadvantage of guy wires is the amount of space they require, usually being an area swept out by a radius as long as the tower is high. Diagonal bracing requires more materials, more connections and may in some cases make a structure too rigid thus forcing it into the same resonant frequency as the lateral force. Such bracing only works well on flat-sided structures with three or four sides. Solid shear walls are too massive for some purposes, although they previously were considered the most reliable structural component for ensuring earthquake survival in buildings having less than twenty stories. Moment resisting frames achieve their structural efficiency based on the principal that they are expected to partially fail without actually collapsing during large earthquakes. This planned failure acts to absorb energy so that lives are not lost; however, the building then has to be replaced.

To date, fixed ocean platforms have used either a rigid structure such as a steel jacket or concrete tube, or used compliant strength means such as seen in tension leg platforms (TLP) or guyed towers. Such rigid structures require larger amounts of material and become prohibitively expensive as water depth and environmental forces increase. Compliant oil production structures such as TLP's also have the disadvantage that their lateral motions must be no greater than 5% of the water depth to avoid breaking the drill strings used therewith which then forces them into a resonant frequency near to that of ocean waves in shallower water thus greatly magnifying the forces.

What is thus required is a light weight, high efficiency structural element adaptable to a wide variety of constructions and environments.

SUMMARY OF THE INVENTION

Accordingly, a general purpose and object of the present invention is to provide a new structural element with the advantage of better economy and performance than existing structural components. Another object is that the structural element be able to function as the structural reinforcing element for a plurality of structures. A further object is that the element be rapidly collapsible and erectable to permit; remote fabrication, ease of transportation and rapid on-site set up. Still another object is that such structural elements be tunable to permit avoidance of resonant frequencies in the structures they support. A still further object is that such a structural element be suitable for use as a lightweight, low-rotational inertia, wide wheel.

These objects are accomplished with the present invention by providing a portable, rapidly erectable apparatus for providing a plurality of structures such as cofferdams, mooring platforms, or portable fluid storage towers. The apparatus comprises a base compression rim, a top compression rim, and if desired one or more intermediate compression rims together with a plurality of spoke-like tension members radially or tangentially arranged so as to connect all rims together for efficient force distribution. When used as an ocean structure, the base rim serves as an anchor while the top rim and any intermediate rims are made buoyant to assure that the tension members remain under load. Where a central volume is desired, e.g., for a cofferdam, an external membrane is disposed over said plurality of tension members.

A more complete understanding of the invention and many of the attendant advantages thereto will be readily appreciated as the same becomes better understood by reference to the following detailed description when considered in conjunction with the accompanying drawings wherein:

BRIEF DESCRIPTION OF THE DRAWINGS

FIG. 13 shows a plurality of structural wheel elements used as the structural reinforcing members of a fluid storage tower.

FIG. 14 shows the fluid storage tower of FIG. 13 in a partially collapsed state due to fluid being drawn off.

FIG. 15 shows a plurality of structural wheel elements used as the reinforcing members of a deep-water platform.

DESCRIPTION OF THE PREFERRED EMBODIMENTS

Figure 1:
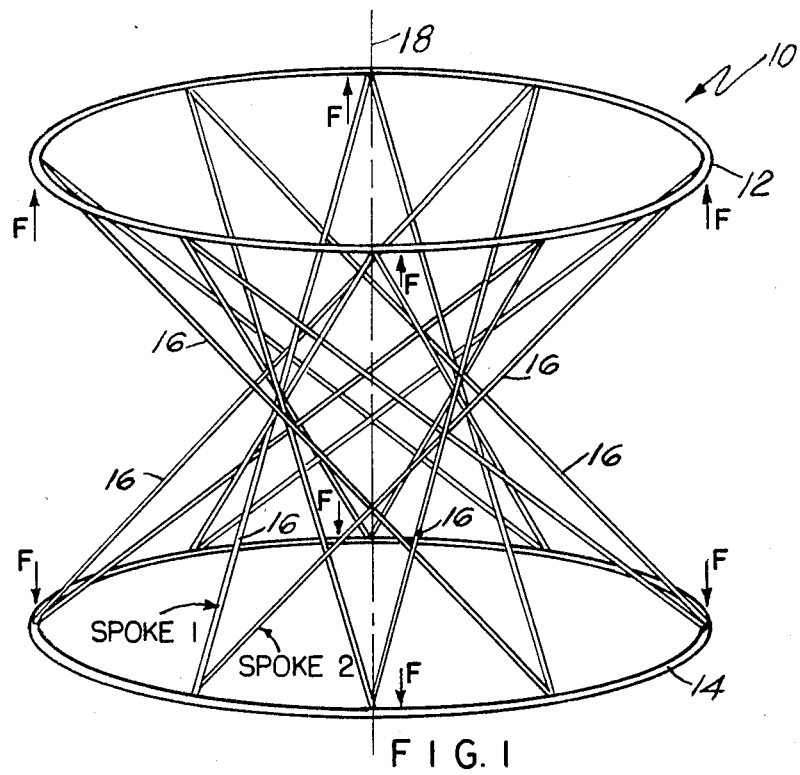
FIG. 1 shows an isometric view of a structural wheel element according to the teachings of the present invention.

Referring now to FIG. 1 there is shown an isometric view of the structural wheel element, "structuwheel" 10 of the present invention. Element 10 comprises compression rims 12 and 14 connected by a plurality of tension member spokes 16. While rims 12 and 14 are shown to lie in parallel planes, this is not essential and nonparallel rims may be used. Also, rims 12 and 14 are shown as circular but they may be any oval shape. Further, each rim is generally planar but some warpage out of plane is allowable. Generally rims 12 and 14 are positioned such that a vertical line 18 perpendicular to the plane of both rims passes through the center of each rim; however, the rims may be positioned up to ½ of a rim diameter off of line 18 without deviating from the present invention. The rims may have almost any desired cross sectional shape, though shown as round in FIG. 1. Spokes 16 lace between rims 12 and 14 following a preselected radial or tangential spoking pattern. A radial spoke pattern is one where all the spokes intersect at the mid point of perpendicular line 18, i.e., the spokes string between a point on one rim and the point furthest away on the opposite rim. A tangential spoke pattern on the other hand connects one rim to the opposite rim without having the spokes pass through the mid point on the above described perpendicular line thereby providing a central opening and torsional rigidity. Key to the functioning of "structuwheel" is the use of a rim separating means, shown schematically in FIG. 1 as a separating force "F". Such force acts to set up the crucial counterbalance of spoke tension and rim compression forces which give element 10 its high strength-to-weight ratio.

Figure 2:
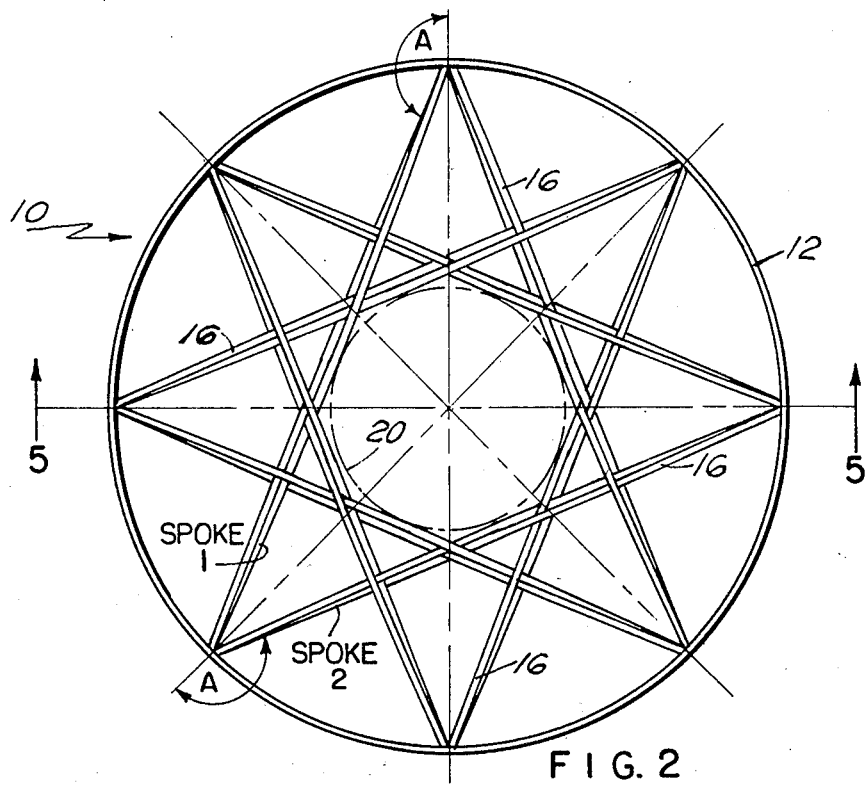
FIG. 2 shows a top view of the wheel element of FIG. 1.

FIG. 2 shows a top view of an element 10 employing a tangential spoke pattern wherein the obtuse angle "A" is chosen to be somewhat less than 180° thereby causing spokes 16 to form a central cylindrical core volume 20. Note that when angle "A" equals 180°, the radial spoke pattern is formed while decreasing of angle "A" tends to increase core volume 20 in the tangential spoke pattern. Starting for example with spoke 1 oriented at angle "A", the spoke is attached to upper rim 12 first and then to lower rim 14. At this same point on rim 14, spoke 2 is attached while oriented again at angle "A" with respect to a diametrical line at that point and then attached to rim 12. This sequence continues for all spokes. Rims 12 and 14 must have high compressive strength such as provided by concrete, metal, plastic, stone, or synthetic composites. Spokes may be made from any material having high tensile strength such as metal, plastic, synthetic fibers, or natural fibers. Spoke patterns are generally symmetrical with spokes attaching at regular intervals around the rims. Many well known fasteners may be used to connect the spokes to the rims, e.g., a threaded spoke and nut assembly similar to a bicycle wheel, looping and tying the spokes around the rim, embedding the spokes in the rim using anchors and welding the spoke or an eye bolt to the rim. Tension in the spokes to effect structural integrity can be produced and maintained by various separating means such as weight or density differences between rims, gravity as when one rim is hung from the other, fluid or gas pressure, solid fill, columns spanning between the rims or a tube insert between the rims having a circumference equal to that of the rims.

For structuwheel element 10 of FIG. 1, when a separating force F is uniformly applied to force the rims apart or a horizontal force acting on one rim causes the rims to slip or slide past each other, the compression in the rims increases and the tension in the spokes increases. Element 10 moves as a unit unless a rim or a tension member spoke breaks. With the exception of minor local shear and bending forces in the rims at points of spoke attachment or force application, the rims are in pure compression and the spokes are in pure tension.

Figure 3:
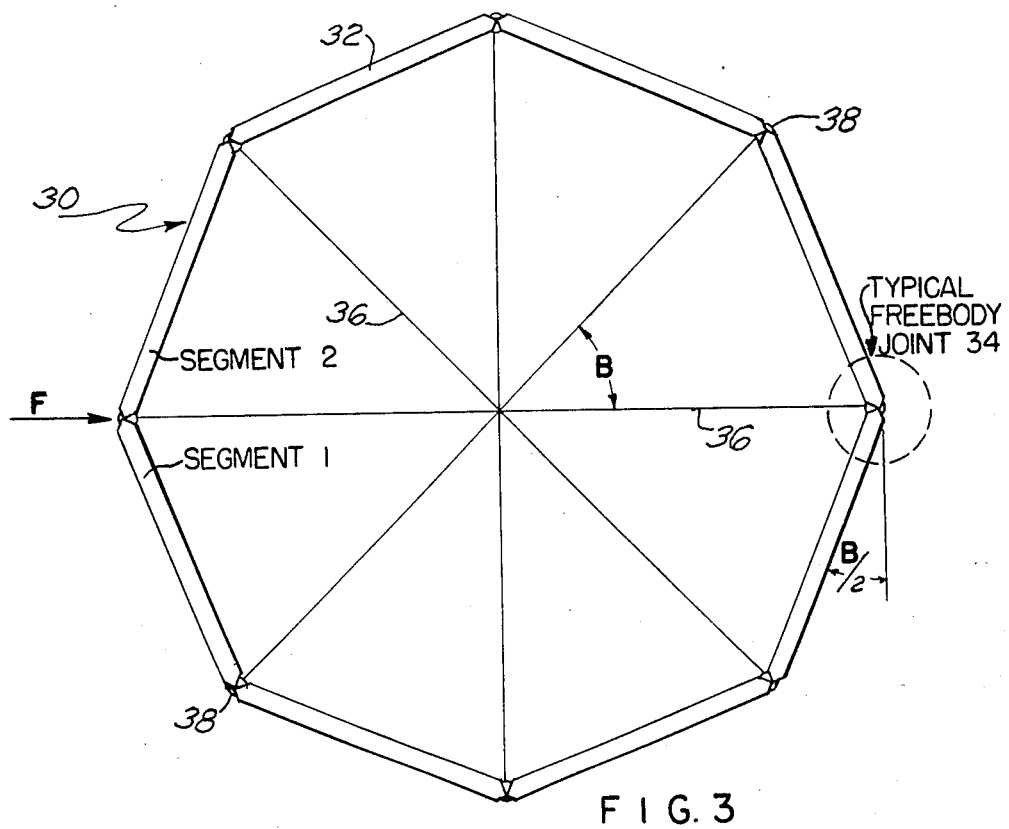
FIG. 3 shows a plan view of a simplified analytical model of a structural wheel element.
Figure 4:
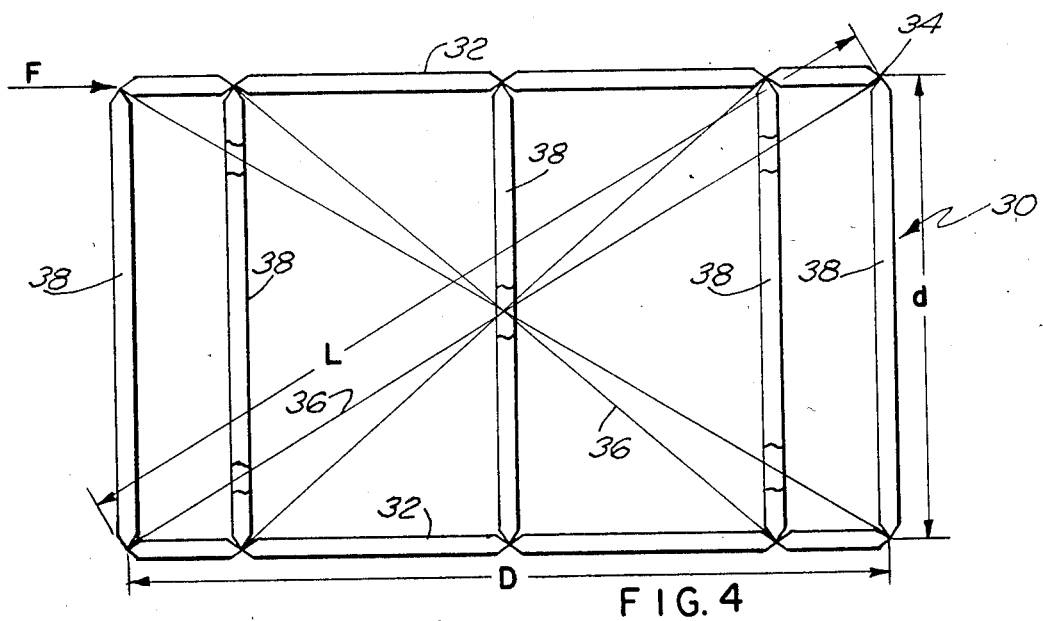
FIG. 4 shows a side view of the analytical model of FIG. 3.

A simplified analytical model 30 of a structuwheel element is shown in plan view and front view in FIGS. 3 and 4, respectively. Model 30 comprises a plurality of straight rigid ring segments 32 joined at each end thereof to a balljoint 34 or the like by pins. While eight segments are shown, it is understood that this may be varied without deviating from the analytical technique shown. An inelastic spoke 36 and a rigid column 38 connect to a pair of segments 32 to complete each ring joint 34 which is free to rotate in any direction. A radial spoke pattern is shown in model 30 to simplify the analysis. The following terms are defined thusly for this analysis:

B is the angle between spokes when viewed as in FIG. 3.
n is the total number of spokes.
$S_p$ is the spoke pre-tension force.
$R_p$ is the rim pre-compression force.
$CL_p$ is the column pre-compression force.
R is the rim compression generated by F when there is no pre-tension.
S is the spoke tension generated by F when there is no pre-tension.
$S_{pr}$ is the component of the spoke pre-tension in the plane of the rim.
F is an exterior applied force.
d is the rigid column length.
D is the length of the horizontal projection of a spoke.
L is the length of a spoke.

By inspection it can be seen that $B=360°/n$. The segmented rim pre-compression is easily determined by viewing a typical balljoint 34 as a free body from which it follows that:

$$CL_p = S_p d/L \qquad (1)$$

$$S_{pr} = S_p D/L \qquad (2)$$

$$2R_p \sin(B/2) = S_{pr} \qquad (3)$$

$$R_p = S_p D/2L \sin(B/2) \qquad (4)$$

When an exterior force F is applied laterally to the top rim the reaction is carried by a reduction in tension in spoke 1 leaving the internally unbalanced $T_p$ in spoke 2 transferring the force to the foundation rim. This is because all the rim segments have the same length and angular relationship, thus the compression must be the same in every segment. If structure 30 has zero pre-tension, the compression in segments 1 and 2, and by extension all the segments, must be:

$$R = F/2 \sin(B/2) \qquad (5)$$

The tension in spoke 1 remains zero. The tension in all the other spokes is given by a free body analysis of a joint 34 thus:

$$S = 2RL/D \sin(B/2) = FL/D \qquad (6)$$

The reaction is transferred to the bottom rim by the lack of tension in spoke 1 and by the internally unbalanced tension in spoke 2. The other spokes, all with tension equal to spoke 2, internally balance each other and maintain the rim shape.

The above analysis can be easily extended to include a tangential spoke arrangement with some extra geometry. More elaborate analytical models can be used to give more precise results for any particular use of this structural element. For example, a finite element analysis implemented on a general purpose digital computer would be appropriate for a large, expensive structure. The increased calculation effort permits taking advantage of a continuous rim, the fill's strength and the elasticity of the remaining structural components in order to economize on materials. For a wheel on the other hand, where the exterior forces are difficult to predict and the safety factors must be higher, proof testing would be more reliable than an elaborate analysis. It is noted that, while FIGS. 3 and 4 represent an analytical model, actual structures using straight or curved rim segments are not precluded thereby.

Figure 5:
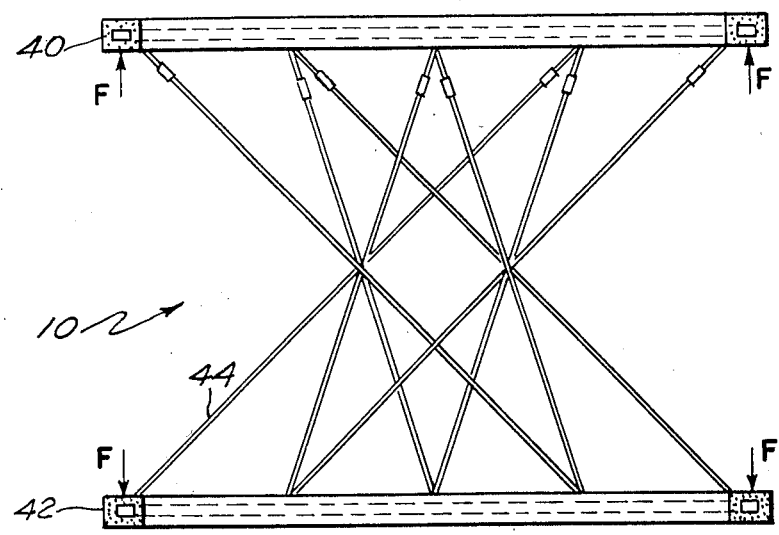
FIG. 5 shows a cross sectional view of the wheel element of FIG. 2 taken along line 5—5 thereof.

FIG. 5 shows a cross sectional view of a version of a structuwheel element 10 having rims 40 and 42 of generally rectangular cross section with a central void passing through. Element 10 is maintained in place by separating force F which acts to force the rims away from each other thereby producing tension in spokes 44. For example, if rim 40 is made buoyant while rim 42 was not, when placed in water force F will then be produced by the uplifting buoyant force.

Figures 6A, 6B:
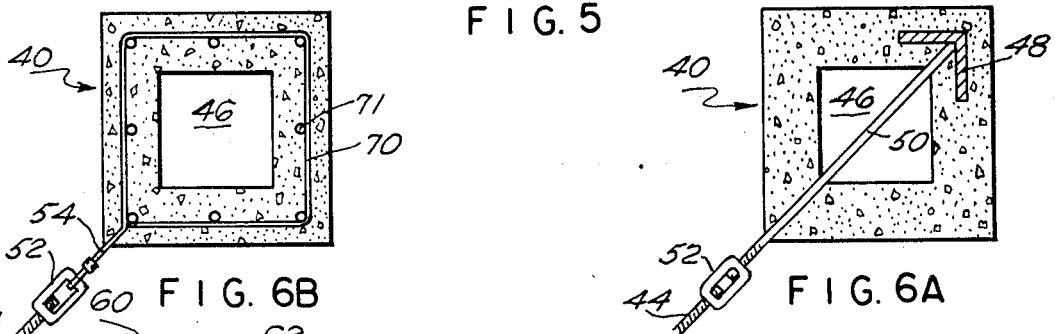
FIGS. 6A and B show detail views of alternate spoke attaching schemes for the wheel element of FIG. 5.

FIGS. 6A and B shows detailed illustrations of alternate techniques which may be used to join spokes 44 of FIG. 5 to any rim. In FIG. 6A, the square or rectangular, hollow, cast concrete rim 40 has a central void 46 for providing buoyancy. An embedded anchoring device 48, which may be a formed metal angle or the like having fixedly attached thereto a rod 50 which in turn has a turnbuckle 52 turnably attached to the threaded end thereof, is cast in place in rim 40. Turnbuckle 52 is then attached to threads on the end of spoke 44 such that when selectively tightened pretensions the spoke. Because rims 40 and 42 may be cast as segments, it follows that anchoring device 48 will correspond in that it may be one continuous ring or a plurality of curved or straight segments. FIG. 6B also shows a cast concrete rim 40 with a central void 46. Spoke 44 is anchored by means of turnbuckle 52 to the threaded end 54 of a wire rope 70. Wire rope 70, which may be somewhat thicker than spokes 44, is helically wrapped around a plurality of rim reinforcing steel rods 71 such that a length 54 of rope 70 will project beyond the cast concrete rim to serve as an attachment point for the spokes. As in FIG. 6A, steel rods 71 may be continuous rings, circular segments or straight bars as desired.

Figure 7:
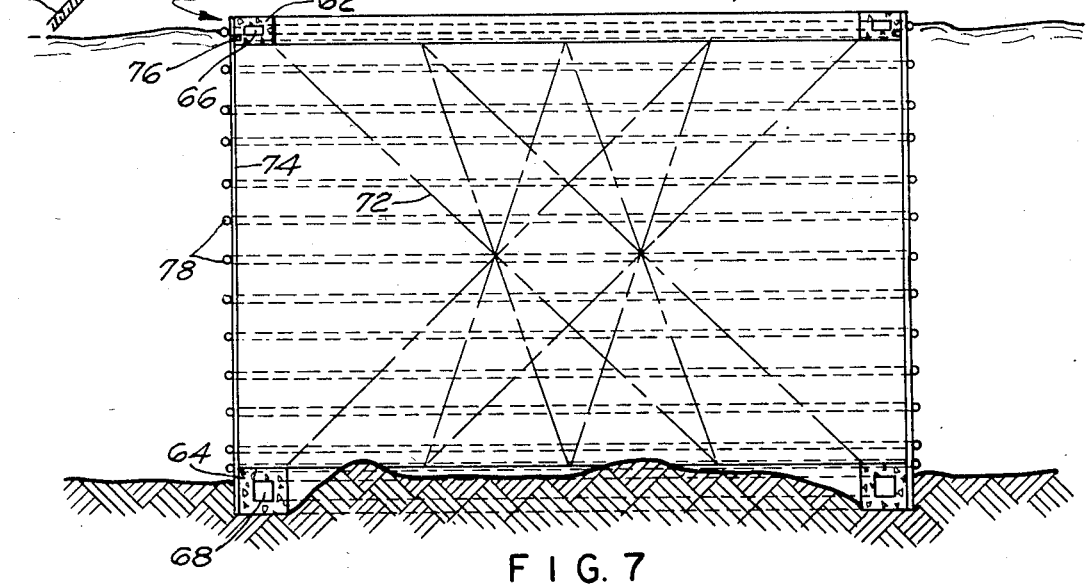
FIG. 7 shows the structural wheel element used as the reinforcing member of an artificial ocean island.

FIG. 7 shows a structuwheel element used as the structural core of an artificial ocean island 60. Rims 62 and 64 are constructed of, but not limited to, reinforced concrete and may be continuous rims or built up from circular rim segments. Sealed voids 66 and 68 in rims 62 and 64 respectively can be used to provide buoyancy during transportation or whenever desired. Void 68 is flooded to sink rim 64 into the ocean floor to serve as an anchor while void 66 remains buoyant, at least until island 60 is filled with earth or the like. The spokes are held in tension during filling, the earth thereafter providing the separating means for the structure. The wire rope spokes 72 are spliced to the wire rope lengths embedded in the rims using turnbuckles, swaged fittings, cable clamps or the like. Spokes 72 are shown to be strung tangentially but may be radially strung also. The tangential spoking allows for a central volume which may be a pipe-lined opening. An earth retaining membrane 74 is attached to top rim 62 by securing it to groove 76 cast into rim 62. Earth retaining membrane 74 is a permeable, geotextile fabric. In cases where the fabric lacks sufficient retaining strength a plurality of tension hoops 78 of wire or synthetic rope are wound around the earth retaining membrane to reduce the load on the fabric and armor the fabric against collision, tears or abrasion. A spiral reinforcement may be used in lieu of hoops. The top tension hoop 78 can then be used to hold fabric 74 in groove 76.

Figure 8:
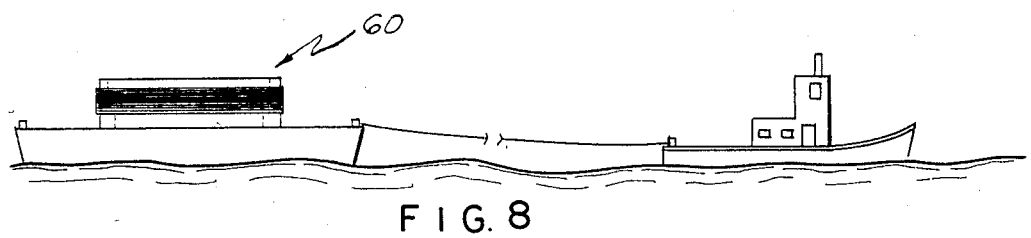
FIG. 8 shows the typical transport-to-site method for the ocean island of FIG. 7.
Figure 9:
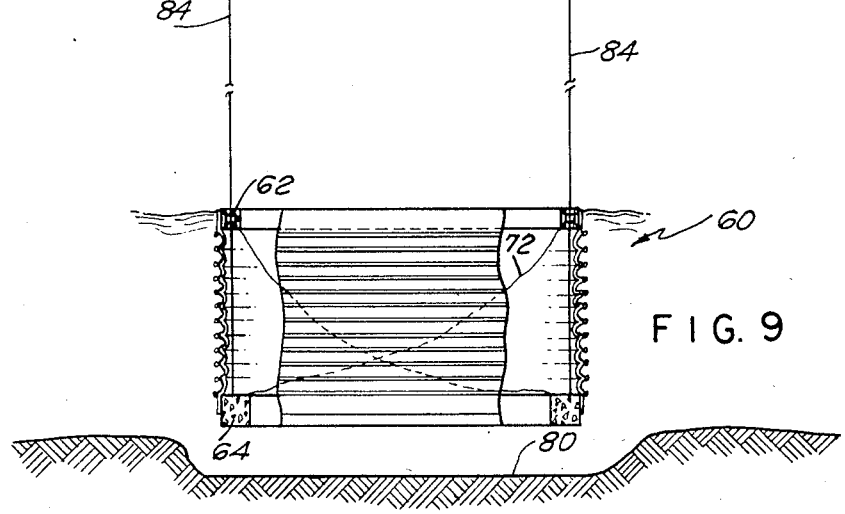
FIG. 9 shows the structural erection of the island of FIG. 7 at a prepared site.
Figure 10:
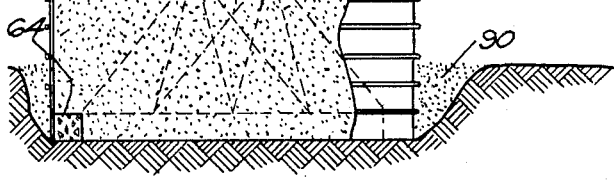
FIG. 10 shows the fill step for the island of FIG. 7.

FIGS. 8, 9 and 10 show the transportation and erection sequence for ocean island 60. Prior to transport, the reinforcing steel members, extending wire rope lengths and casting forms selected for each rim are assembled in a drydock. Concrete is then poured into the forms. The rims may be cast in one circular piece or in circular segments. The next rim is assembled on top of the first rim. Once rims 62 and 64 have been cast, spokes are attached to the wire rope lengths, the geotextile fabric with reinforcing hoops, is attached to each rim, and the fabric and spokes are folded and held with temporary ties so they can be deployed easily once on site. The drydock is flooded and the free-floating or barged structuwheel island 60 is towed as in FIG. 8 to the site. For very large structures, it may be more economical to cast the rims as circle segments. These rim segments then may be strung together and towed in a line for assembly at the site vice in a drydock.

FIG. 9 shows the ocean island site prepared by dredging a level ring shaped area 80 in the ocean floor. The depth of the excavation is determined by the desired resistance to foundation failure. When the site is ready and the structuwheel reinforced island 60 has been maneuvered into position, buoyant top rim 62, which supports winchs 82, floats. This allows anchor rim 64, shown alternately here to be solid concrete, to be sunk in a controlled manner by winches 82 using jacking cables 84 attached to rim 64. As rim 64 sinks, spokes 72 and the geotextile fabric unfold. If production facilities will eventually sit atop artificial island 60, top rim 62 can be temporarily pulled under water and held down at a predetermined depth to permit floating of such facilities into the cylindrical volume formed by the rim. Rim 62 is then refloated. An alternative arrangement would be to erect the production facilities inside the rims as the rims are built but prior to towing to the site.

As shown in FIG. 10, after positioning rims 62 and 64 and stretching fabric 74, structure 60 is soil filled with material 90 which may be sand or the like. The fill material used depends upon what is economically available and the strength desired. Geotextile fabric 74 being permeable, a hydraulic filling technique is used through pipe 92. Excess water escapes out through the fabric as well as over the top rim. Additional strength, resistance to earthquake loads, and more uniform support for the rim and the production facilities can be obtained by deep pile vibratory compaction of site 80. Further uniformity of foundation support can be achieved by injecting grout beneath the facilities. Fill 90 is also placed around the exterior of rim 64 to at least the level of the previous grade.

The structuwheel element, when used as the internal reinforcement of an artificial island 60, has many advantages. By dredging flat surface 80 below the ocean floor for bottom rim 64, the sliding failure plane becomes very large and capable of resisting tremendous lateral forces. The structuwheel so reinforces the structure above the ocean floor that the possibility of a shear failure in the island is remote and the contained fill material does not require as much shear or compression strength. Failure of the structure by squashing out fill from between the rims is obviated for the most part by the reinforced geotextile fabric. The use of this island containment scheme has the advantages of less fill required, faster on-site erection, and a collapsible, more easily movable structure. Without the structuwheel, the fill container has to be a relatively massive, and therefore expensive, structural component. Because the amount of material necessary for structuwheel in this application increases in direct proportion to water depth it becomes even more cost effective in deeper water than previous systems as the volume of material for uncontained islands and ballasted cones increase by the cube of the height. For the same diameter, materials for structural containers such as caissons, increase by the square of depth. The structuwheel reinforced ocean island containment thus provides the advantages of a collapsible container; i.e., easier off-site construction and transportation to site, and efficient use of materials together with the advantages of solid tube construction; i.e., a more solid base to resist sliding, the top remains open and stationary for easy filling, and the full weight must be lifted to realize any vertical movement. Structuwheel may also be used as a mooring dolphin or a bridge pier protecting cofferdam.

Figure 11:
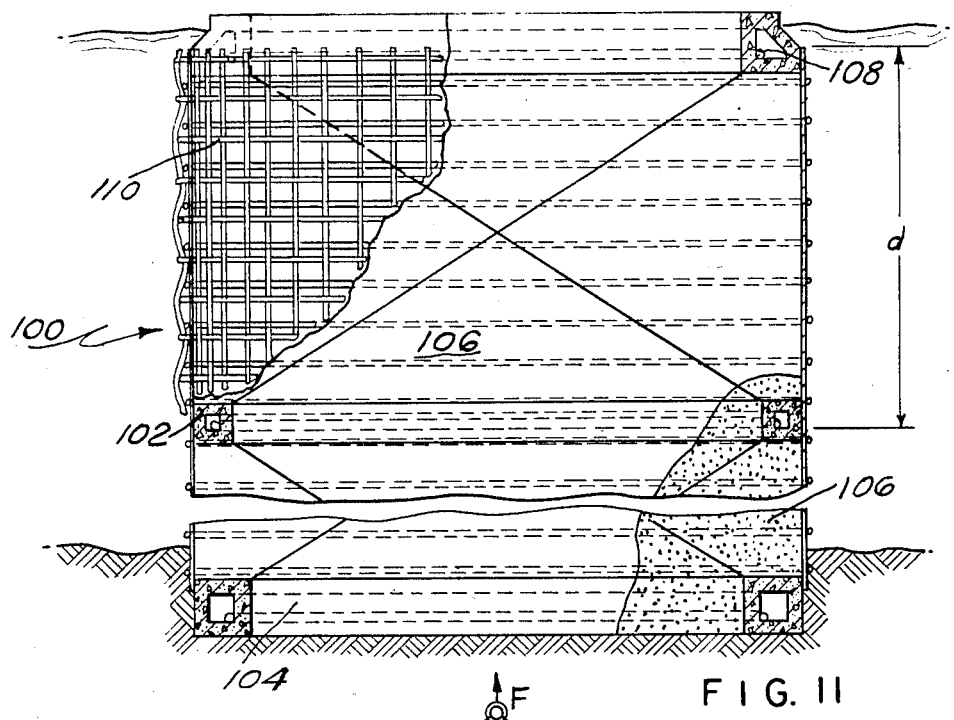
FIG. 11 shows an ocean island configuration having a plurality of structural wheel elements.

FIG. 11 shows an artificial island 100 using a plurality of structuwheel elements interrelated in such a way as to form a deep water island containment particularly suited for Arctic use. A plurality of intermediate rims 102 are positioned between anchor rim 104 and the top rim. Spokes are shown as radial in schematic form but may be tangential. Earth fill 106 is contained as before by a reinforced fabric. An internal chord 108 is shown as holding a plurality of rim segments together to form each rim. Construction, transport and on site erection is the same as previously discussed for the single element island of FIG. 7. One or more of the intermediate rims 102 in addition to the top rim may be made buoyant to aid in deployment, earth fill 106 then being relied upon to provide the rim separating force which maintains the required element preloading. An ice net 110 is attached to the top rim and to intermediate rims as needed, extending a preselected depth "d" up to 50 meters. The geotextile fabric is protected by net 110 which is made from galvanized wire rope or the like. For example, a weave of ½" wire positioned on 6" centers both ways may be used. The ice will freeze to the wire rope, but the wire being much stronger than the ice, particularly in tension and shear, would not break as free floating ice chunks slide by. Rather, a layer of steel reinforced ice will build up and protect the permeable or impermeable geotextile fabric used from tearing.

Figure 12:
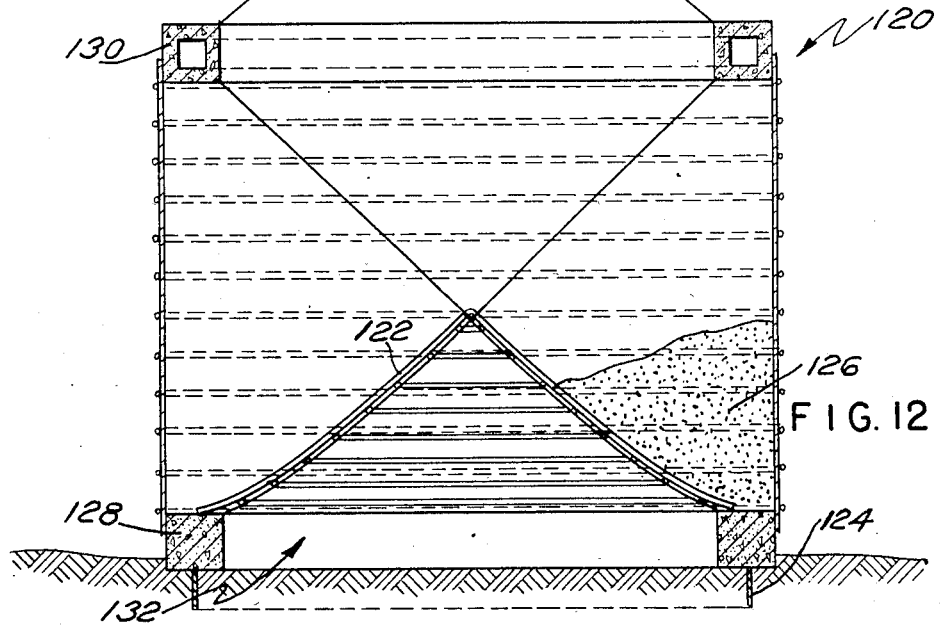
FIG. 12 shows a structural wheel element as the reinforcing member of a dead weight ocean anchor.

The structuwheel basket or dead weight anchor 120 shown in FIG. 12 uses one or more structuwheel elements to maintain shape. The rim, spoke and fabric assembly is basically the same as for the structuwheel artificial island of FIG. 7. The primary difference is the addition of a geotextile fabric 122 above the lower half of the spokes to form a bottom for the basket. When used as an anchor, bottom rim 128 is modified with an ocean floor penetrating sheet 124. This, combined with an impervious bottom fabric 122, allows a suction void 132 to be maintained at a lower pressure. Such low pressure serves to both drive penetrating sheet 124 into the ocean floor and to hold anchor 120 down. If a temporary, portable anchor is desired, the low pressure void under fabric 122 is pumped out and used as the only holding force, the separating force being provided by a lifting force F vice dirt fill 126. For the typical installation, the anchor assembly is transported to the site, sunk and filled as for the structuwheel artifical island. In addition to the sliding and vertical load resistance offered by the base rim 130, the ability to elevate the top of the anchor significantly above the ocean floor is also an advantage.

FIGS. 13 and 14 show a fluid tank 140 using radially spoked structuwheel elements as the primary structural component. In its simplest configuration, above-ground tank 140 generally has the same rim, spoke and side wall fabric as an aritificial island. However, wall fabric 142 as well as top fabric 144 and bottom fabric 146 which are added to seal in fluid 148, must be impermeable. Spoke tension can be maintained in any of several ways. A plurality of columns 152 forcing the rims apart would provide the most fail-safe system. More portable alternatives are to use fluid 148 pressure combined with a device to maintain constant spoke tension, such as a winch 154 with a brake. Air or fluid pressure maintained by a compressor can also keep adequate tension in the spokes.

For fluid tank 140, low weight makes it portable. Thus, the rims are best made out of high strength-to-weight metal. Metal wire spokes 150 can be attached to base rim 158 and rims 162 with swaged end fittings or eye splices, and toggle bolts. A plurality of long spokes 150 connect to each rim in series from top to bottom, threading over pulleys or rolls 166. The rims can be made in segments for quick bolting together on site and can include attachment devices previously welded to the rim segments such that the spokes can be quickly attached in the field. The site foundation 156 is prepared first, then bottom fabric 146 is spread, the bottom rim segments are assembled, and the resulting bottom rim 158 so formed is attached to bottom fabric 146 and wall fabric 142 which is reinforced by hoops 164. Next, intermediate rim segments 160 are assembled and attached to the wall fabric 142 at preselected locations. A plurality of spokes 150 are then strung, each spoke traversing from top to bottom over pulleys 166. The top fabric 144 is attached to top rim 162 and the structure is ready for inflation or filling. The structure is flexible in that it can be tuned to minimize earthquake and wind loads. Also, fluid can be spilled rapidly out the top thereof by selectively shortening the spokes.

Advantages of a structuwheel used as reinforcement for a fluid tank include collapsibility. The spoke constant tension device, winch 154, allows the distance between the rims to vary without affecting the tank's structural integrity. There is additional flexibility because the spoke tension can be maintained by rim buoyancy, fluid pressure, columns or a circumferential wall. A structuwheel element added to the interior of a standard steel tank would add strength so as to prevent failure in unusual situations such as hurricane waves or earthquakes at less cost than other systems.

The structuwheel platform 180 of FIG. 15 has a plurality of structuwheels as the primary structural elements. In one configuration the bottom anchor section 182, set in ocean floor 183, operates as a structuwheel dead weight anchor as previously described in FIG. 12. Several intermediate sections 184 connected by membrane 185 are used between anchor section 182 and the platform 186 or top rim 188. The tension in spokes 189 is maintained by the buoyancy of platform 186. Note that the platform is configured like a semi-submersible, i.e., the buoyancy volume is well below the water surface while the wave zone is penetrated with thin columns 192. An alternate configuration would be for platform 186 to be supported and tension maintained in spokes 190 by water or oil pressure inside the structure. For oil storage, impermeable membrane 185 would have to be sealed. The shape of the retained fluid is determined by tension hoops 194 and by available slack in the vertical direction. The fluid is then free, within these parameters, to slosh in response to wave forces. This characteristic may be used to tune the pressurized fluid mass to minimize forces transmitted to the platform, i.e., the flexible fluid mass 181 is used to dampen and absorb the wave forces. A ballasted support disc 196 may be used as shown or an ocean wheel dead weight anchor such as shown in FIG. 12 may be used to contain ballast 198.

The structuwheel as a fixed ocean platform component has the limited lateral motion advantage of rigid structures as well as the advantages of compliant structures; i.e., less materials, structural tunability to avoid certain resonant frequencies and collapsible and hence reusable construction.

Figure 16:
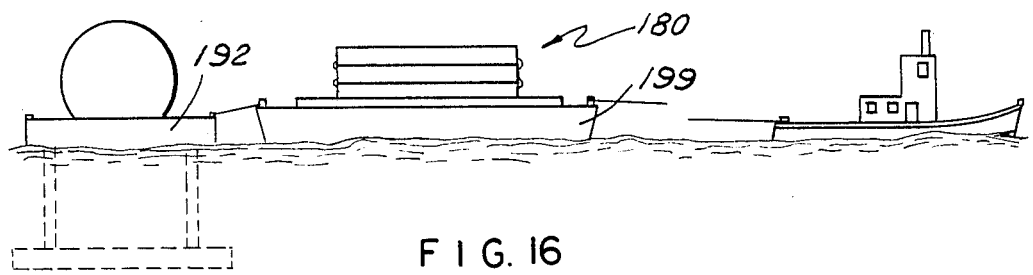
FIG. 16 shows the transport-to-site method for the deep-water platform of FIG. 15.
Figure 17:
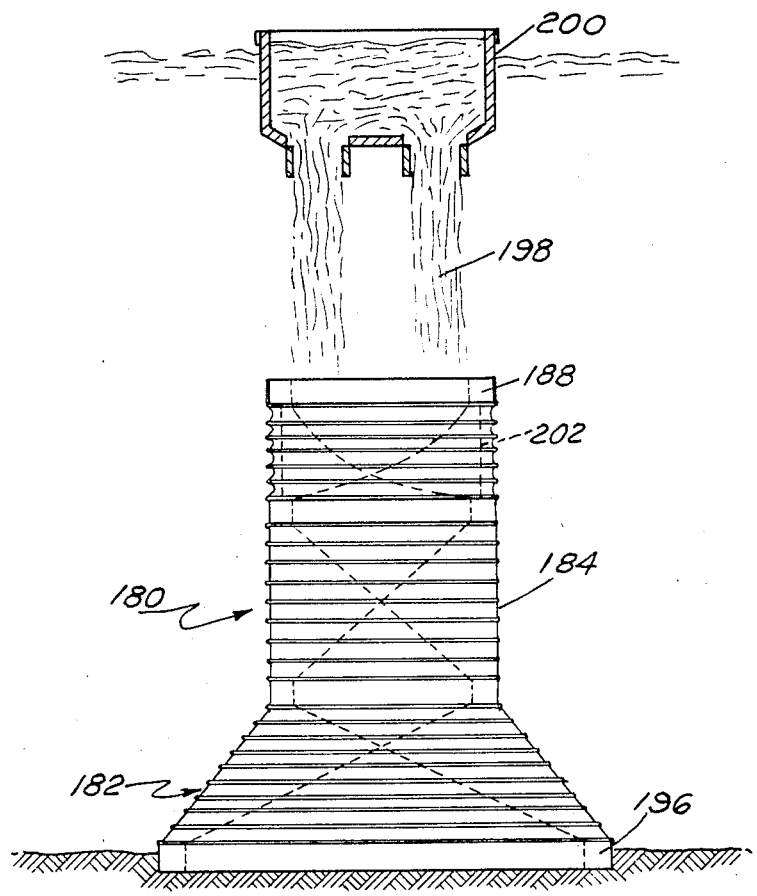
FIG. 17 shows the fill step of the erection sequence of the deep-water platform of FIG. 15.

FIGS. 16 and 17 show the structuwheel ocean platform 180 which is built in a fashion similar to previously described ocean structures herein. The components are staged in a dry dock and towed free floating or on a barge 199 to the site in an assembled but collapsed state. The platform is then carefully sunk into position by selective ballasting of the rims and then the anchor portion 182 is filled with ballast 198 from ballast barge 200 or the like. Platform 192 is positioned over the top rim, ballasted down and attached. The volume inside membrane 202 is then pressurized so the resulting buoyancy force or stored fluid pressure maintains spoke tension. Some precautions are necessary as the situation is unstable until a minimum spoke tension is achieved.

Figure 18:
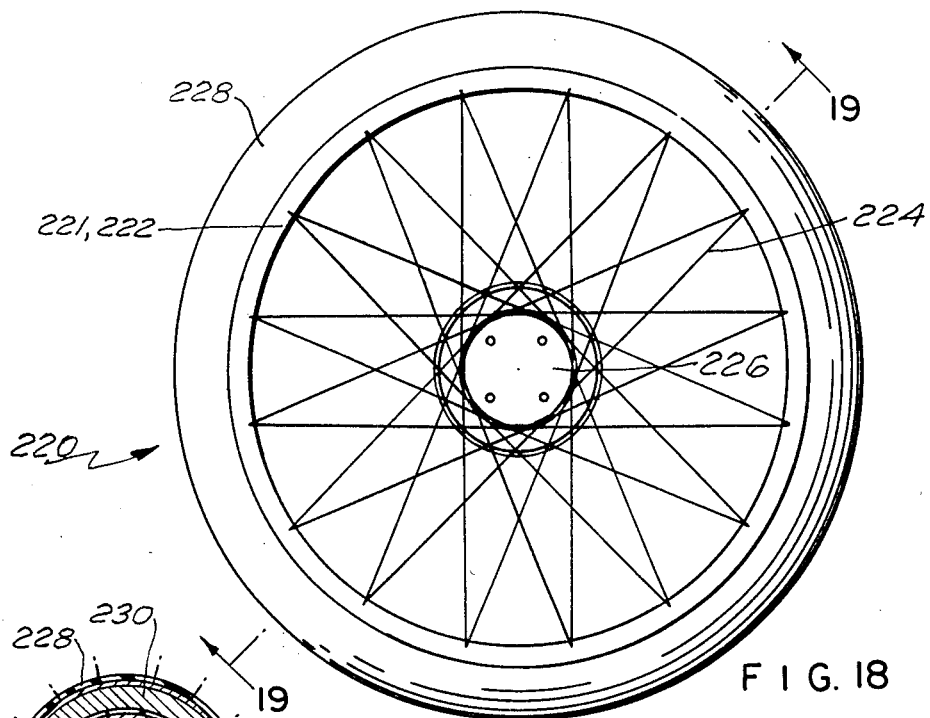
FIG. 18 shows a front view of a wide wheel having a structural wheel element as the structural basis thereof.
Figure 20:
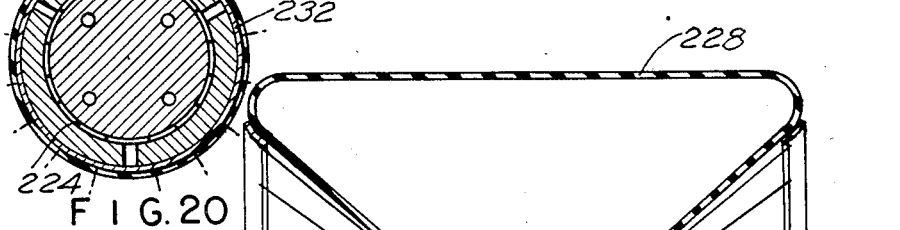
FIG. 20 shows a front detail view of the hub-to-spoke attachment for the wide wheel of FIG. 19 taken along line 20—20 thereof.
Figure 19:
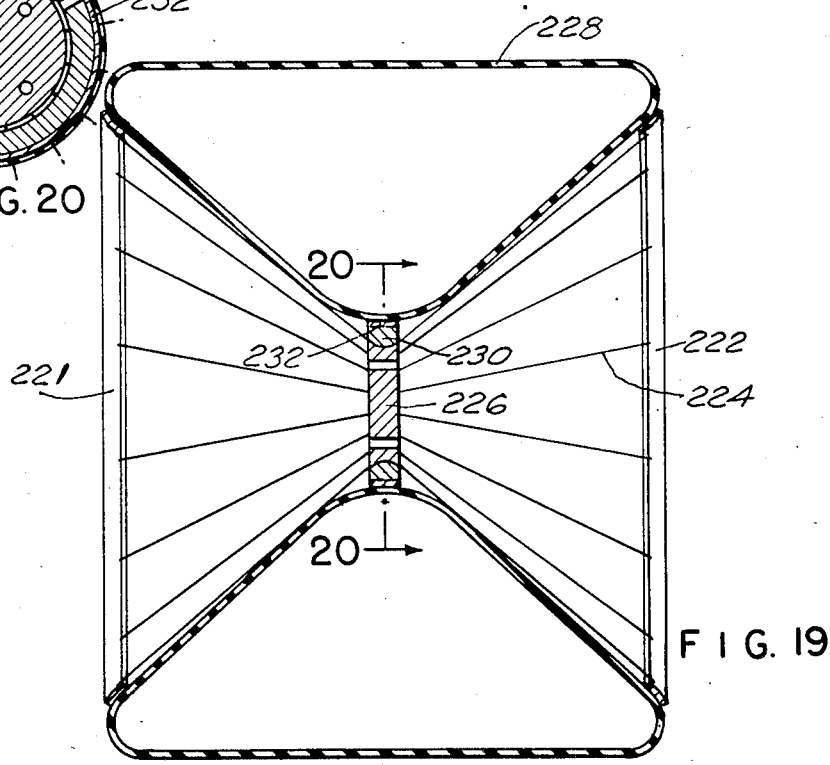
FIG. 19 shows a cross sectional view of the wide wheel of FIG. 18 taken along line 19—19 thereof.

FIGS. 18, 19 and 20 show the structuwheel element used to form a wide wheel 220 comprising two rims, 221 and 222, each configured as a tire mounting flange. Rims 221 and 222 are and connected using the previously described tangential spoke pattern except that spokes 224 in this case are connected to an attaching hub means such as a hub plate in the center volume. The hub plate is machined so as to serve as a connection to an axle. A one piece tire 228, with integral inner tire liner, completes the assembly by forcing rims 221 and 222 apart when gas inflated. While spokes 224 may attach in a manner similar to those used for bicycle wheels (where each spoke is threaded on each end and the rims are shaped and drilled to receive elongated upset bolts which screw onto the spoke) the preferred spoke-to-hub attachment scheme is as shown in FIG. 20. Hub base 226 is shaped and drilled to hold spokes 224 which are continuous from rim 221, through hub 226, to rim 222. A plurality of circumferential spoke holding segments 230 hold each continuous spoke 224 into contact with hub base 226 when a continuous tension band 232 squeezes the spoke holding segments 230 against the hub base 226, holding them in place. Band 232 is tightened prior to pressurizing tire 228. A banding machine, such as used for banding boxes prior to shipment, could be used to tension band 232. Tension in each spoke 224 and compression in each rim 221 and 222 are produced when tire 228 is installed and inflated.

The inner tire liner could resemble an automobile tire inner tube, but with sufficient reinforcing to maintain shape and contain internal air pressure when used in conjunction with a conventional, open ended automobile tire. Rims 221 and 222 are made like bicycle rims of extruded or rolled metal wrapped in a circle. Each rim is shaped to grab the tire bead as well as receive the spoke bolts. Tires used can be commercially available types or perhaps be wider and lower than usually seen.

When wheel 220 is rolling on a smooth surface, or when a bump is encountered, force is conveyed to the axle via the hub plate by an increase in spoke tension and rim compression due to shearing the rims relative to the hub plate. During turns by a vehicle using wheel 220, the turn reaction causes the tire to pull the inside rim away from the hub plate. This results in an increase in tension in the spokes on the inside of the turn, which transmit the tire reaction to the hub plate. Sufficient air pressure is used to ensure tire/rim contact on the outside rim. When used as large aircraft wheel, it is possible to collapse the wheel by deflating the tire, all as part of landing gear fold-up.

Specifically, the structural wheel element provides a less massive, lighter, lower rotational inertia wide wheel Further, tire air pressure can be used to adjust the wheel's behavior under dynamic loads. Low pressure would give a very flexible wheel, high pressure a more rigid wheel. Because only air presssure holds the rims apart, the wheel will collapse for storage and transportation.

Figure 21:
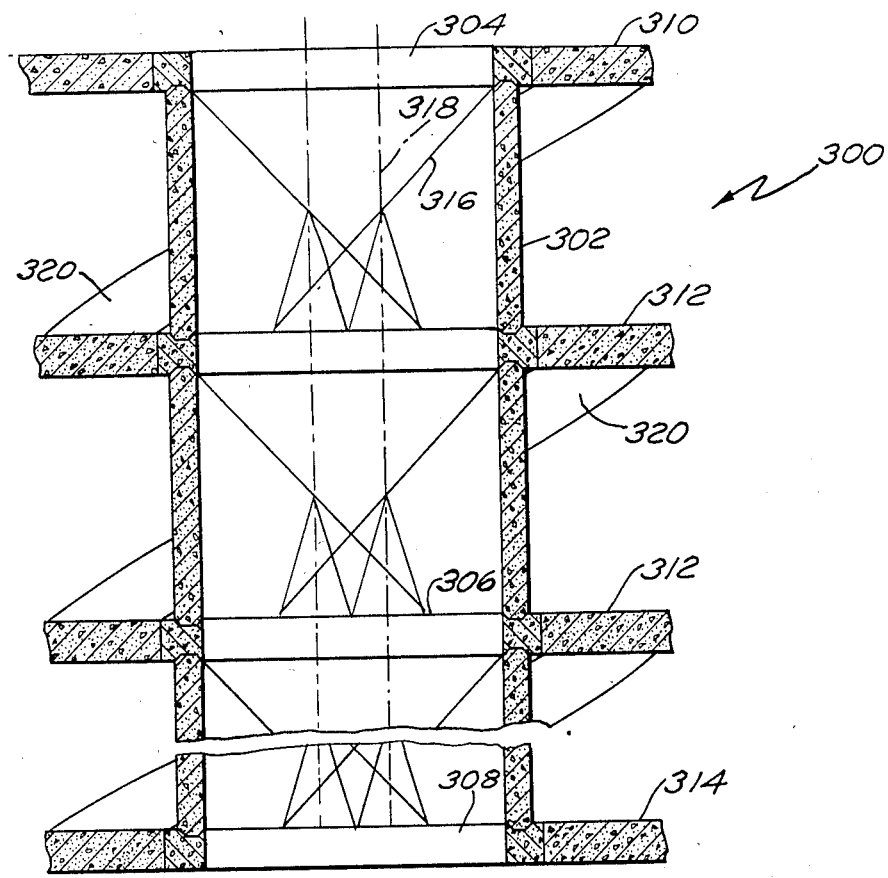
FIG. 21 shows in cross section, a portion of a building using a plurality of structural wheel elements to form the elevator tower thereof.

FIG. 21 shows a structuwheel tower 300 having one or more structuwheel elements as its core. The tower has thin shell concrete cylinder shaped walls 302 or a series of columns separating top rim 304, intermediate rims 306 and foundation rim 308. The structuwheel as a tower or tall building component is a relatively compact efficient means to transfer shear loads to the foundation. A tower made with this structural element is both efficient and artistic. The tower uses the thin shell concrete cylinder walls 302 or the series of columns to provide the separating force for the rims. Several intermediate rims are used depending on the height of the tower. A tangential spoke 316 arrangement provides an opening 318 in the center for either an elevator or a stairwell. If several towers are used in a building, perhaps as a substitute for earthquake or wind shear walls, the rims would be connected to the building's floors. Such a use would be ideal for a car parking structure. The car parking structure could have spiral ramps 320 winding around the tower.

Tower 300 is built using either precast post-tensioned rim segments with precast columns or may employ standard cast-in-place construction. However, the following approach is preferred. Cast foundation rim 308 in place with spoke anchoring inserts and column receiving indents. Cast other rims 306 and top rim 304, one atop the other, also with spoke anchoring inserts and column receiving indents. Precast the columns or shells 302 concurrently. Jack-up each rim in sequence high enough to place the columns or shell into the inserts. Then lower the rim to trap the columns. Next install and tension the spokes. Repeat the operation for each rim. Note that the column or shell placing and spoke installing work is done within the first story elevation depending upon how high the initial stack of rims was.

What has thus been described is a portable, rapidly erectable structural element for providing a plurality of structures such as cofferdams, mooring platforms or portable fluid storage towers. The apparatus comprises a base compression rim, a top compression rim and if desired one or more intermediate compression rims together with a plurality of spoke-like tension members radially or tangentially arranged so as to connect all rims together for efficient force distribution. When used as an ocean structure the base rim serves as an anchor while the top rim and any intermediate rims may be buoyant to assure that the tension members remain under load. Where a central volume is desired, e.g., for a cofferdam, an external membrane is disposed over said plurality of tension members.

Obviously many modifications and variations of the present invention may become apparent in light of the above teachings. For example, the structuwheel island 60 could be used as a bumper to prevent ships from colliding with bridge piers. In such a use, the earth retaining membrane could be held off from and not attached to the rims to provide an earth filled space which protects both the rim and any ships which collide with the island. In that case the membrane would be supported by temporary flotation during construction. The earth fill further stiffens the structuwheel island and provides the primary resistance to sliding failure. Due to spoke tensioning after fill, the buoyant rim need not remain so. The structuwheel has excellent characteristics to make a single pedestal pool table support. If foils are substituted for the columns, the structuwheel could be either a large squirrel cage fan or wind energy generation device. The structuwheel element is also suitable for use as the strength member for large hanging flowerpots.

In light of the above, it is therefore understood that within the scope of the appended claims, the invention may be practiced otherwise than as specifically described.

What is claimed is:

1. A structural system for efficiently distributing forces impinging thereupon, comprising:
   at least two rim members, spaced a preselected distance apart, each said rim member having an axis perpendicular to the plane of the rim, said axes being aligned so as to be generally parallel with each other, for transferring said impinging forces by means of compression loads in said rims, said perpendicular axes of said at least two rim members being coaxial, thereby forming a common axis of symmetry of said system, each said rim member further comprising a toroidal ring of a preselected cross section;

tension member means, disposed between and fixedly attached around the periphery of each rim of directly adjacent pairs of said rim members, for selectively connecting together each said adjacent pair of rims in such a way as to maintain a preselected distance between rim members, said tension member means further comprising a plurality of spokes connectably strung in a preseleected uniform pattern between said directly adjacent rim pairs, each said spoke being fixedly attached at one end thereof to one rim of said pair and at the other end thereof to the other rim of said pair, said preselected spoke pattern being tangentail, each spoke being disposed at a preselected angular offset from a diametrical orientation such that the attaching point on the opposite rim serves also as the starting point for the next spoke, and continuing until the final spoke end attached at the starting point of the first spoke, said pattern thereby forming a central volume therethrough;

separating means, applied symmetrically around the periphery of each said rim member so as to axially separate each said rim member from adjacent rim members, for producing a tension load in said tension member means, said tension load in turn producing said corresponding compression load in each said rim member thereby producing a balance of said tension and compression forces throughout said structural system;

cylindrical membrane means, disposed around the outer periphery of each of said at least two rim members;

a plurality of membrane reinforcing circular hoops, fixedly attached to the exterior of said membrane at uniform intervals, for providing increased radial strength; and wherein said separating means further comprises earth fill, disposed throughout the internal volume of said cylindrical membrane means, said tension member means having been first placed in tension by an externally applied force such that upon removal of said externally applied force said earth fill then maintains rim member separation hence holding said tension members in tension.

2. A structural system according to claim 1 further comprising a cylindrical net for protecting against externally impinging ice, said net being fixedly attached to the top member of said at least two rim members and extending down a preselected length along the outer surface of said cylindrical membrane.

3. A structural system according to claim 2 wherein said preselected cross section of said at least two rim members is generally rectangular with a corresponding rectangular void passing therethrough such that said rim members are hollow and thus buoyant when sealed, the bottom rim member being flooded so as to serve as an anchor.

4. A structural system according to claim 3 wherein said hollow rim members further comprise a plurality of hollow rim segments and a flexible chord member connectably attaching said rim segments together end to end so as to form a rim member, said chord member passing through the void in each rim segment.

5. A structural system according to claim 4 wherein said plurality of hollow rim segments are cylindrical.

6. A structural system according to claim 4 wherein said plurality of hollow rim segments are straight, adjacent rim segments being connected by a plurality of movable joints, each said moveable joint having a plurality of degrees of freedom.

7. A structural system according to claim 5 further comprising a circular membrane fixedly attached around the periphery of said anchor rim member.

8. A structural system according to claim 7 wherein said cylindrical membrane and said circular membrane further comprise a permeable fabric.

9. A structural system according to claim 7 wherein said cylindrical membrane and said circular membrane further comprise an impermeable fabric.

* * * * *